United States Patent [19]
Wilson et al.

[11] Patent Number: 5,590,622
[45] Date of Patent: Jan. 7, 1997

[54] CLAW OF A MILKING MACHINE

[75] Inventors: Allan W. Wilson; Jim F. Pharoah, both of Hamilton, New Zealand

[73] Assignee: Carter Holt Harvey Plastic Products Group Limited, Hamilton, New Zealand

[21] Appl. No.: 335,765

[22] PCT Filed: May 6, 1993

[86] PCT No.: PCT/NZ93/00034

§ 371 Date: Feb. 14, 1995

§ 102(e) Date: Feb. 14, 1995

[87] PCT Pub. No.: WO93/22901

PCT Pub. Date: Nov. 25, 1993

[30] Foreign Application Priority Data

May 11, 1992 [NZ] New Zealand ............................ 242686

[51] Int. Cl.⁶ ...................................................... A01J 5/00
[52] U.S. Cl. ...................................................... 119/14.54
[58] Field of Search ................................. 119/14.54, 14.55

[56] References Cited

U.S. PATENT DOCUMENTS 3,150,637  9/1964  Fosnes ................................. 119/14.54
4,807,566  2/1989  Chowdhury ........................ 119/14.55

FOREIGN PATENT DOCUMENTS 1160900  8/1969  United Kingdom ................ 119/14.54

*Primary Examiner*—Robert P. Swiatek
*Attorney, Agent, or Firm*—Jacobson, Price, Holman & Stern, PLLC

[57] ABSTRACT

A claw for use in a milking system. The claw includes claw bowl member defining a sump having a claw milk line outlet; and a claw body member engageable with or engaged with the claw bowl member to define together with the sump a chamber. The claw body member has four claw milk nipples to allow in use a stream of milk ingress from each respective inlet inwardly into the chamber. The claw is characterized by the claw body member having surface defining arrangement (whether in the form of webs, vanes or otherwise and whether interrelated or otherwise) that in use provide for each stream an (at least partly) inwardly extending surface which in use provides (at least in part) for a locus (e.g. by curving) of substantially non-turbulent milk flow down into the bowl, and including at least one removable weight housed therein but not in communication with the chamber(s).

17 Claims, 3 Drawing Sheets

CLAW OF A MILKING MACHINE

BACKGROUND OF THE INVENTION

1. Field of the Invention

The present invention relates to improvements in and/or Relating to Milking Systems and particularly, although not solely, to a claw for use in such milking systems.

2. Description of the Prior Art

It is known to provide within a milking system a milking claw having a claw bowl member defining a sump having a claw milk line outlet and a claw body member engageable with or engaged with the claw bowl member to define, together with the sump, a chamber, the claw body member having four claw milk nipples to allow a stream of milk ingress into the chamber. Normally such a claw bowl member and/or the claw body member is associated with a pulsator assembly or unit to operate the cups which are to be connected by tubes to the claw milk nipples to operate in at least one of the modes (i) four and 0, (ii) 2 plus 2 (fore and aft) and (iii) 2 plus 2 (side to side).

U.S. Patent Specification 4,537,152 discloses such a claw assembly. A feature of the claw assembly of U.S. Pat. No. 4,537,152 is its recognition of a desire to reduce, foaming of the milk in the claw because foam, a result of the incorporation of air into the milk, causes off-flavours and also may render a downstream motoring system inaccurate. The applicant recognizes that any turbulent handling of milk in a claw additionally damages the integrity, of the milk and therefore the careful handling that can arise from the use of a claw assembly as disclosed in U.S. Pat. No. 4,537,152 has the additional benefit of providing for a collection and dispatch of milk through the claw milk line outlet of a better quality,. This is achieved in the claw assembly of U.S. Pat. No. 4,537,152 by use of a tangential infeed of milk from the claw milk nipples onto a frusto conical surface.

Such prior art claw assemblies that do provide for a careful handling of the milk have the disadvantage in that there is no prospect of forms providing a real impediment to cross infecting movement of milk (or any foam that might be created) from one claw milk nipple to another.

SUMMARY OF THE INVENTION

The present invention is directed to an alternative claw assembly to those previously known which will in at least some embodiments provide the public with a useful choice.

In a first aspect the invention consists in a claw for use in a milking system, said claw comprising a claw bowl member defining a sump having a claw milk line outlet, and a claw body member engageable with or engaged with said claw bowl member to define together with said sump a chamber, said claw body member having four claw milk nipples to allow in use a stream of milk ingress from each respective inlet inwardly into said chamber and having surface defining means (whether in the form of webs, vanes or otherwise and whether interrelated or otherwise) that in use provide for each stream an (at least partly) inwardly extending surface which in use provides (at least in part) for a locus (eg by curving) of substantially non-turbulent milk flow down into the bowl.

Preferably, said surface defining means partitions, at least partly, the upper regions of said chamber so as to require in use a movement against gravity if any milk entering the chamber from any claw milk nipple inlet to the chamber is to contact any of the other inlets.

Preferably said claw body member is arranged with the claw milk nipples directed substantially radially inwardly if one considers the claw body as a notional circular member in plan.

Preferably said claw milk nipples are directed radially inwardly and downwardly i.e. with respect to the sump position which is below the claw body member.

Preferably a pulsator assembly is positioned either on said claw body member above the defined chamber or on said claw bowl member below said sump and thus below said chamber.

Preferably said pulsator system is operable in one of the following modes or preferably a choice of the modes (i) four and 0, (ii) 2 plus 2 (fore and aft) and (iii) 2 plus 2 (side to side).

Preferably the surface defining means each extend downwardly within said claw bowl member but each is spaced inwardly thereof to assist in cleaning.

Preferably said surface defining means is in the form of webs that encourage a spiralling down of the milk flow with impingement (or such other first contact therewith) occurring substantially close to the parallel (eg less than 20°) on said inwardly extending surface preferably prior to following a curving thereof.

Preferably the spiral flow on said surface defining means continues onto an inwardly facing surface of the claw body member and/or claw bowl member.

Preferably the milk flow in said spiral flow slows prior to collection in the sump owing to drag and/or spread.

Preferably the surface defining means interconnect to provide distinct surface configurations required for each claw milk nipple inlet, the intersection providing for the positioning of an interconnection member to hold a said claw body member to a said claw bowl member.

Preferably said claw bowl member is formed in a transparent plastics material.

Preferably said claw body member is of a plastics material.

Preferably said claw and/or pulsator unit thereof (if any) includes housed weights capable of being adjusted by addition or removal to or from a group to adjust overall weight, said weights not being in communication with said chamber.

In a further aspect the present invention consists in a claw body member useful for combining with a claw bowl member defining a sump and having a claw milk line outlet so as to provide a claw as previously defined.

In yet a further aspect the present invention consists in a claw body member as defined when in conjunction with a pulsating unit attached thereto.

In still a further aspect the invention consists in a claw for a milking system comprising:

a claw bowl member defining a sump having a claw milk line outlet, and a claw body member engageable with or engaged with said claw bowl member and having four claw milk nipples to allow in use four streams of milk ingress, each from their respective inlet inwardly into a chamber or chambers defined by said claw body member with said claw bowl member, one or both of said claw bowl member and said claw body member including at least one removable weight housed therein but not in communication with said chamber(s).

Preferably the housed weights are housed as a cluster and are only removable after the removal of a sealing cover.

Preferably said cluster of weights is adapted to be positioned above the chamber and within said claw body member.

In a further aspect the present invention consists in a claw assembly which includes a claw bowl member as previously defined.

In yet a further aspect the present invention consists in a claw bowl member and/or claw body member and/or any claw assembly which is a combination of any one or more of the claw bowl members, claw body members or claw assemblies previously defined.

The invention consists in the foregoing and also envisages constructions of which the following gives examples.

BRIEF DESCRIPTION OF THE DRAWINGS

Preferred forms of the present invention will now be described with reference to the accompanying drawings in which.

DESCRIPTION OF A PREFERRED EMBODIMENT

Persons skilled in the art will appreciate that conventional milking claws have one of two things in common, (1) the milk entry from the short milk tubes going to claw milk nipples is such that the milk travels in "free space" between the milk entry nipple and the bulk of the milk in the claw and/or (2) the claw milk entry nipple is arranged so the milk entry is such that it flows along the inside surface of the claw bowl.

These two methods have drawbacks which the present invention addresses.

In claws that use method (1) the milk entering crashes into the milk already in the claw bowl. This creams turbulence in the milk flow such that milk damage occurs and the milking vacuum is made unstable. Method (2) goes some way to eliminate the above disadvantages with method 1. The milk entering the claw stays in contact with the side wall of the claw bowl and this, in turn, slows down the milk flow before it enters the main body of milk in the claw bowl hence reducing turbulence and milk damage. The disadvantage of such a method however, is the angle the milk entry nipples must make with the body of the claw. This can be both hard to manufacture and is not in reality, an ideal angle for hanging of the milking cups to the average cow.

The present invention solves the problems, in at least its preferred embodiments, by using internal webs in the claw bowl. The milk entry nipple can be at angles to suit both manufacturer and cow teat alignment while milk flow can be maintained on a surface and not in free space, ie. the surface of the web.

An additional advantage of the embodiments of the present invention is that the internal webs, preferably radial from a centre of the claw, also act as partial separators between the four milking quarters of the cow. This has the effect of helping in the prevention in the spread of mastitis from one teat to another by eliminating cross-infection. Moreover the use of the internal webs to provide the surface defining means of the present invention has the effect of increasing the strength of the claw structure.

Figure 4:
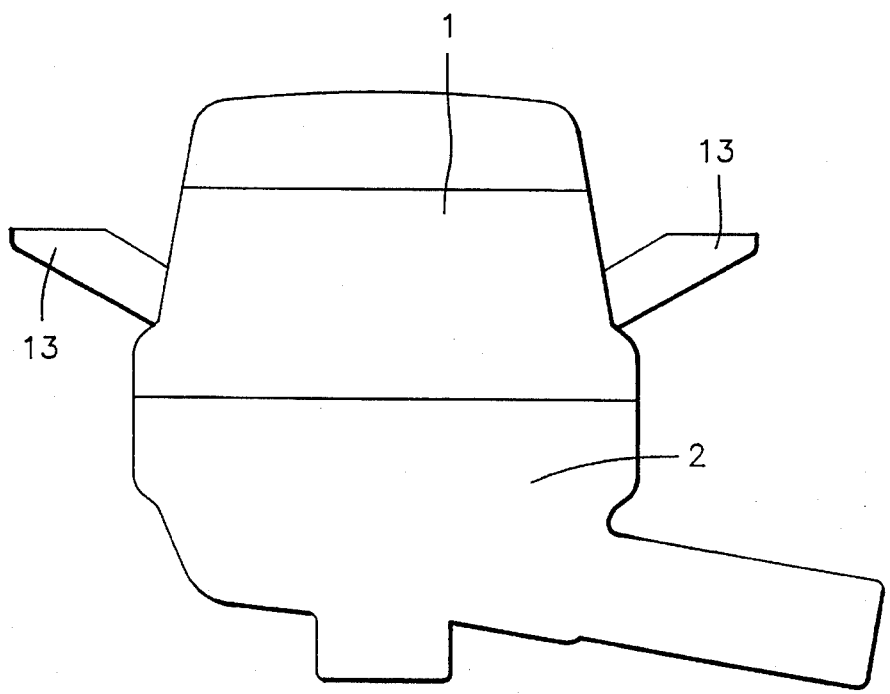
FIG. 4 is a side view from the same direction as for the cross-section of FIG. 3 showing by way of example how the exterior of a claw assembly as defined might look.

In the preferred form of the present invention the claw of the invention (or the milking system of the invention uses a claw) formed from two main assemblies. The first main assembly is that shown in FIGS. 1 and 2 and identified as 1. This is the claw body member. The other main sub-assembly or assembly is the claw bowl member defining a sump having a claw milk line outlet. This is indicated as 2 in FIG. 4. Preferably the member 2 is largely formed from a transparent plastics material. The sub-assembly 1 (which is the claw body member) is preferably formed of a plastics material but this need not necessarily be transparent.

Preferably the claw body member is formed so as to also accommodate in conjunction therewith a pulsator unit assembly. Alternatively, it could be separate or indeed even be included under the bowl member.

The claw bowl member 2 includes a claw milk line outlet 3. While not shown, in some other forms of the present invention the valve is capable of being sealed on or about the mouth of the claw milk line outlet 3.

The claw body member 1 has a stepped periphery at 6 capable of sealing on an appropriate annular sealing ring 5 to define the chamber at least partly partitioned in the upper reaches thereof by the webs or vanes 7 which preferably extend below the periphery 6.

Figure 3:
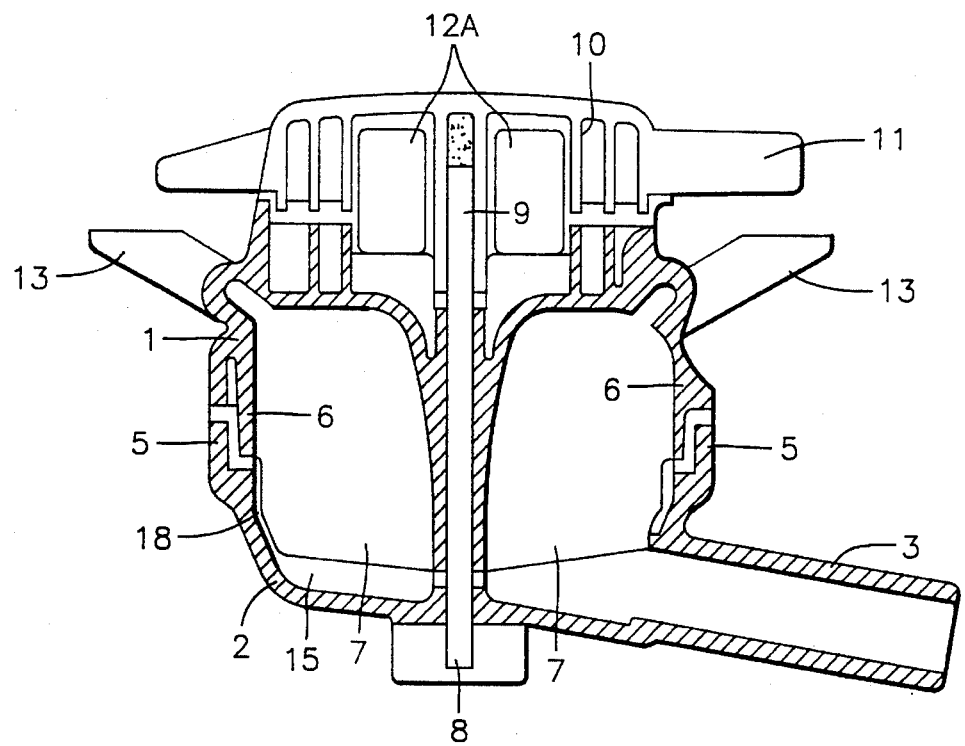
FIG. 3 is a cross-sectional view in a vertical plane that includes the claw milk line outlet of the claw bowl member.
Figure 5:
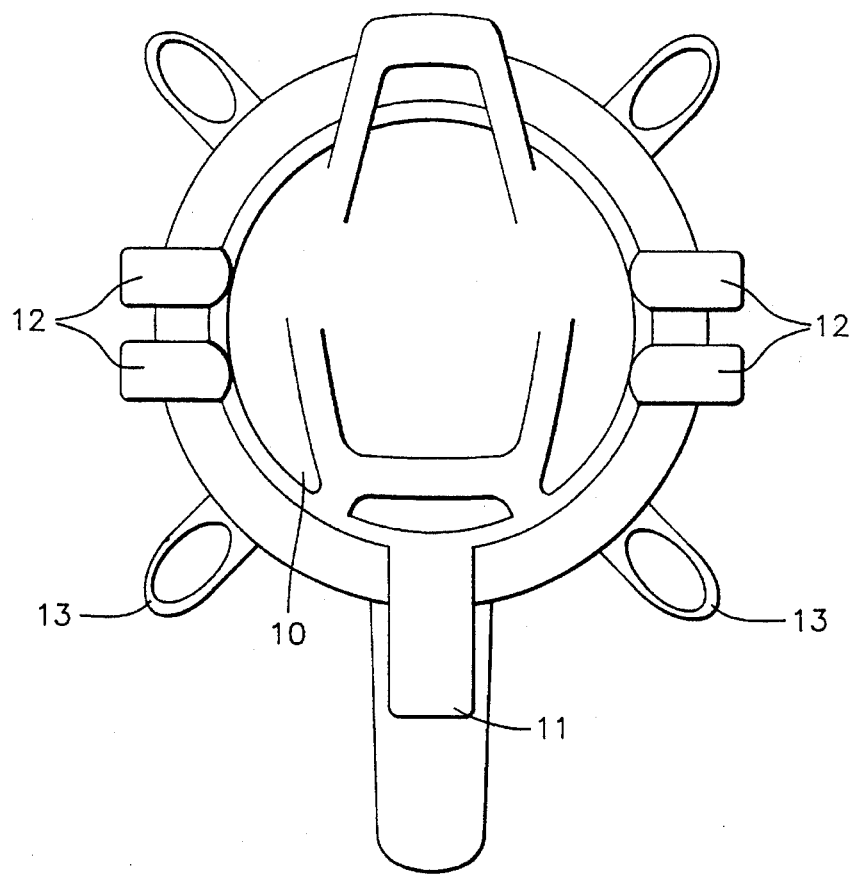
FIG. 5 is a plan view of an assembly as shown in FIG. 4 again showing how the assembly thereof may look from above if a pulsator unit or assembly is positioned on or at least partly within the mouldings or the like which define at least in part said claw body member.

The body member is preferably held to the bowl member by means of the threaded member 8 which is preferably engaged as shown in FIG. 3 into the bowl member 2. The member 9 which has a lower extremity 8 (which is threaded) preferably also associates the pulsator unit 10 to the remainder of the member 1. The pulsator unit can best be seen in FIG. 5 as being a unit having a main vacuum line 11 and pairs of vacuum nipples 12 each for association with a milk cup via a vacuum hose.

Preferably disposed within the pulsator unit 10 but removable therefrom are a number of weights (preferably annular) 12A capable of providing a desired weight for the animals to be milked or at least suitable to a particular farmer.

Disposed as shown in the accompanying drawings, the webs, vanes or the like 7 define (as shown particularly in FIGS. 1 and 2) a surface that in use provides for each stream from a claw milk nipple 13 an inwardly extending surface on which impingement or run on preferably is close to the associated claw milk nipple inlet and which surface then provides in use for a locus (preferably by curving) of substantially non-turbulent milk flow (preferably with a speed loss owing to drag and/or spread) down into the sump 15 within the chamber defined by the members 1 and 2 with the members 7 extending sufficiently far down within the chamber and so formed as to require a significant movement against gravity if any milk entering from one claw milk nipple 13 is to have any prospect of contact with any other inlet.

Figure 1:
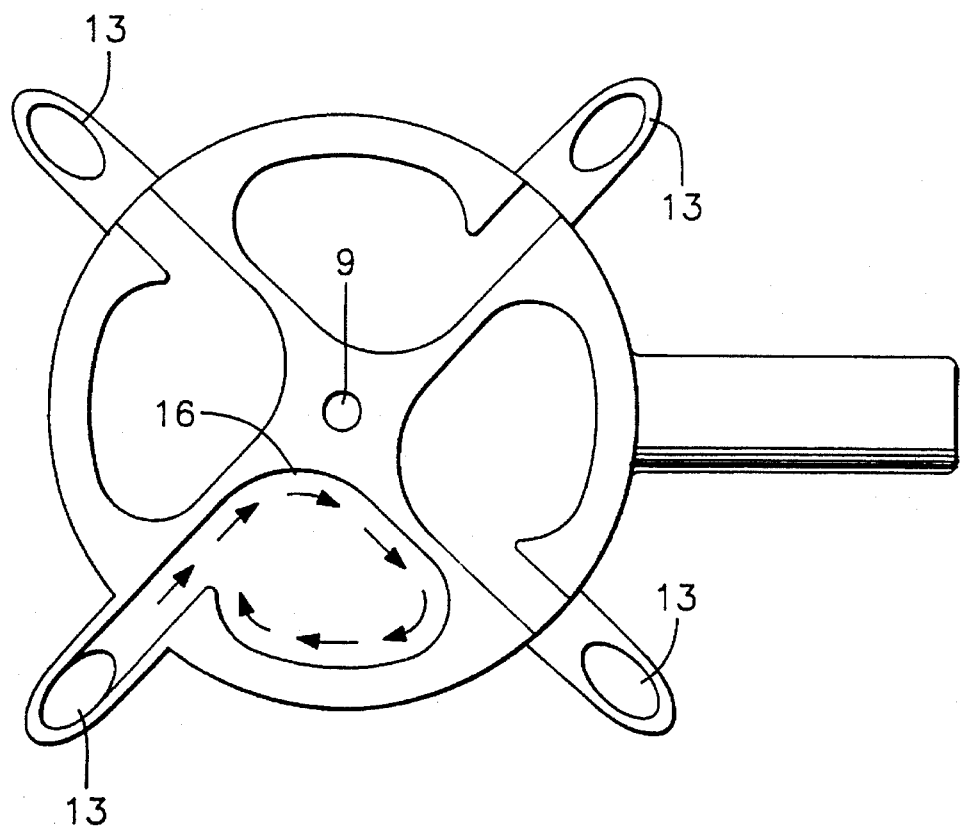
FIG. 1 is a cut away section (the cut away being in a plane parallel to the plane of the interface of the claw bowl member/claw body member but through the claw body member alone ) showing the direction of infeed from one claw milk nipple into the enclosed chamber onto a surface, defining means (in this case formed by a web or vane) about which the milk curves preferably in the form of a spiral locus prior to leaving a lower extremity of the claw body member and/or running onto the surface of the bowl to merge with the milk stream from the other claw milk nipples in the sump of the claw bowl member.
Figure 2:
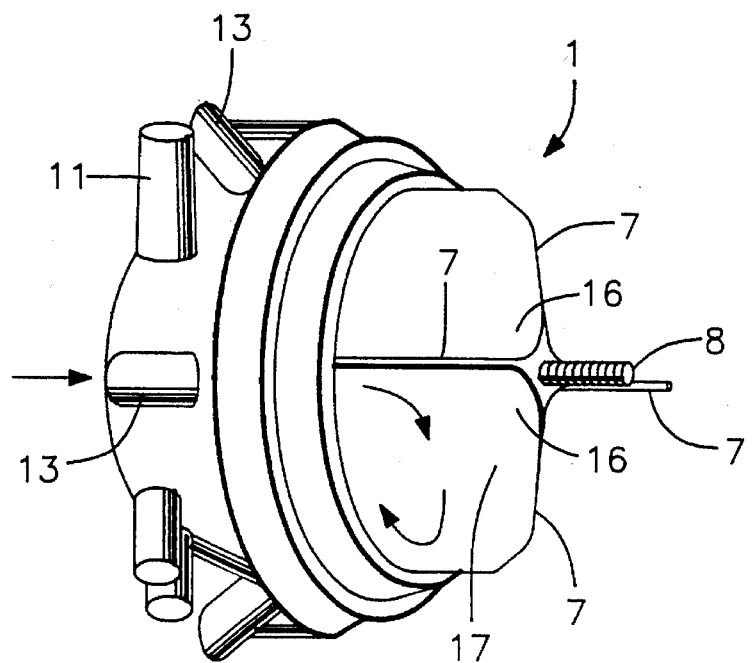
FIG. 2 is a perspective view from below of a claw body member as shown in FIG. 1 showing an infeed and the nature of the spiral of the milk flow at least at the commencement regions thereof and additionally showing how the surface defining means extends downwardly beyond the claw body member/claw bowl member interface so as to better partition the upper regions of the chamber so as to require in use a significant movement against gravity if any milk entering the chamber from any inlet is to contact any of the other inlets.

The curves at 16 in the surface defining members allow for a spiralling of the milk as shown fully in FIG. 1 or, if otherwise configured, restricted to a simple spiral down and dropping off from another part of the web 7 such as from 17 into the sump 15 if the extent of the downward projection of the web 7 is not sufficient or for other reasons the full spiralling down as shown in FIG. 1 does not occur. Indeed part of the spiralling shown in FIG. 1 by the arrows can be (and preferably is) that which occurs on the inside surface of the bowl member 2 within the sump region or thereabove.

For hygiene purposes preferably the web members 7 do not contact the sides of the bowl member 2 within the proximity of the sump 15. The gap is shown best in FIG. 3 and indicated as 18.

Persons skilled in the pulsator art will appreciate the options of mode of operation that a pulsator unit such as 10 might operate, ie. whether as a 4 and 0, a 2 plus 2 (fore and aft) or a 2 plus 2 (side to side).

Figure 6:
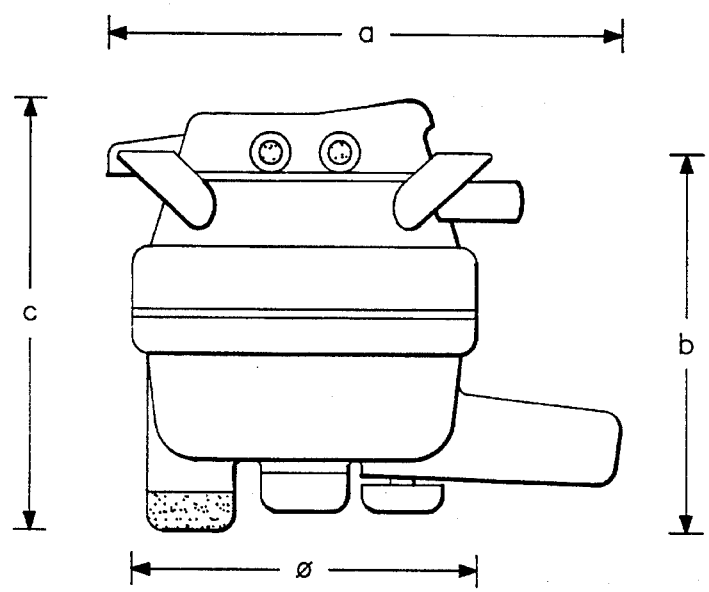
FIG. 6 is a view of another preferred embodiment showing its outside appearance.

The embodiment configured in FIG. 6 shows a preferred appearance of a claw with the following specifications:

| | |
|---|---|
| SUMP CAPACITY: | 300 mls |
| WEIGHT (Optional): | 375 g |
| | 575 g (with weights) |
| PULSATION: | 4 + 0 |
| | 2 + 2 (F/Aft) |
| | 2 + 2 (Side/Side) |
| DIMENSIONS: | (c) 115 mm High |
| | (a) 155 mm Long |
| | (ø) 100 mm |
| | (b) 110 mm |
| AUTO SHUT OFF: | Optional |
| INLET MILK NIPPLES: | 9 mm Bore |
| OUTLET MILK TUBE: | 19 mm to accept |
| | ¾" and ⅝" tube |
| MATERIALS: | TOP Supertough Nylon |
| | BODY High Impact Nylon 408L |
| | BOWL Grilamid TR 55 |
| | SEALS Silicone. |

It is believed that a milk claw and the use of such a milk claw in a milking system in accordance with the present invention will find widespread acceptance.

We claim:

1. A claw for use in a milking system, said claw comprising:

a claw bowl member defining a sump having a claw milk line outlet; and a claw body member engageable with said claw bowl member and having an outer peripheral wall to define together with said sump a chamber, said claw body member having (i) four claw milk nipples extending from said peripheral wall, each providing an inlet to allow in use a stream of milk from each respective inlet inwardly into said chamber and (ii) surface defining means that partitions said chamber at least in part down in to said sump so as to isolate each stream from the others at least substantially until pooling of milk occurs in said sump, said surface defining means nevertheless being so constructed and arranged to extend inwardly of the outer peripheral wall of said claw body member to define for each inlet stream a dedicated substantially straight and vertically arranged, radially extending surface onto which it can impinge in substantially a parallel manner, there being a continuation of each such surface that will provide a substantially non-turbulent milk flow locus that curves substantially only after reaching a position proximate to a radially central axis of the chamber, thereafter curving down onto an inside surface of said bowl member or the milk surface whichever in use is the higher.

2. The claw as claimed in claim 1 wherein said surface defining means partitions at least partly the upper regions of said chamber so as to require in use a movement against gravity if any milk entering the chamber from any claw milk nipple inlet to the chamber is to contact any of the other inlets.

3. The claw as claimed in claim 1 wherein said claw body member is arranged with the claw milk nipples directed substantially radially inwardly if one considers the claw body as a notional circular member in plan.

4. The claw as claimed in claim 1 wherein said claw milk nipples are directed radially inwardly and downwardly i.e. with respect to the sump which is below the claw body member.

5. The claw as claimed in claim 1 wherein a pulsator assembly is positioned on said claw body member.

6. The claw as claimed in claim 5 wherein said pulsator assembly is operable in at least one of the following modes:

a first mode wherein four cups respectively connected to said four claw milk nipples are simultaneously operated and deactivated by the pulsator assembly;

a second mode wherein two front cups of said four cups are operated alternatingly with two aft cups of the four cups; and a third mode wherein one of said aft cups and one of said front cups are operated alternatingly with the other one of said aft cups and the other one of said front cups.

7. The claw as claimed in claim 1 wherein the surface defining means each extend downwardly within said claw bowl member but each is spaced inwardly thereof to assist in cleaning.

8. The claw as claimed in claim 1 wherein said surface defining means is in the form of webs that encourage a spiralling down of the milk flow with impingement occurring substantially close to the parallel on said inwardly extending surface.

9. The claw as claimed in claim 1 wherein, in use, said continuation of each surface is arranged so as to direct said substantially non-turbulent milk flow locus toward a radially inwardly facing surface so that said substantially non-turbulent milk flow locus continues curving along said radially inwardly facing surface.

10. The claw as claimed in claim 1 wherein, in use, the milk flow during curving slows prior to collection in the sump owing to at least one of two factors, said two factors including drag and spread.

11. The claw as claimed in claim 1 wherein the surface defining means interconnect at an intersection to provide distinct surface configurations required for each claw milk nipple inlet, the intersection providing for the positioning of an interconnection member to hold a said claw body member to a said claw bowl member.

12. The claw as claimed in claim 1 wherein said claw bowl member is formed in a transparent plastics material.

13. The claw as claimed in claim 1 wherein said claw body member is of a plastics material.

14. The claw as claimed in claim 1 wherein said claw includes housed, removable weights having a total weight which is selectively adjustable by selectively adding and removing individual ones of said weights, said weights not being in communication with said chamber.

15. A claw body member for combining with a claw bowl member defining a sump and having a claw milk line outlet so as to provide a claw, said claw body member comprising:

an outer peripheral wall arranged so as to define a chamber when combined with said sump, said claw body member having (i) four claw milk nipples extending from said peripheral wall, each providing an inlet to allow in use a stream of milk from each respective inlet inwardly into said chamber and (ii) surface defining means arranged so as to partition said chamber at least in part down in to said sump so as to isolate each stream from the others at least substantially until pooling of milk occurs in said sump, said surface defining means nevertheless being so constructed and arranged to extend inwardly of the outer peripheral wall of said claw body member to define for each inlet stream a dedicated substantially straight and vertically arranged, radially extending surface onto which it can impinge in substantially a parallel manner, there being a continuation of each such surface that will provide a substantially non-turbulent milk flow locus that curves substantially only after reaching a position proximate to a radially central axis of the chamber, thereafter curving down onto an inside surface of said bowl member or the milk surface whichever in use is the higher.

16. A claw body member as claimed in claim 15 and further comprising a pulsating unit attached thereto.

17. A claw for a milking system comprising:

a claw body member defining a sump having a claw milk line outlet; and a claw body member engageable with or engaged with said claw bowl member to define together with said claw bowl member a chamber, said claw body member having, means defining an inner periphery, four claw milk nipples to allow in use the ducting of a stream of milk from each respective inlet substantially normally of said inner periphery inwardly into said chamber, the partitioning means which
 (i) in use partition said claw body member internally of said inner periphery and extend down into the claw bowl member thereby isolating prior to milk accumulation in the sump the milk flows of each inlet from each other,
 (ii) braces said means defining an inner periphery,
 (iii) defines for each milk inlet stream a substantially straight and vertically arranged, radially extending surface substantially parallel to the stream, on which the inwardly directed stream can impinge, and
 (iv) defines a surface from the impingement surface for each stream that leads each stream in substantially laminar flow into a non-turbulent engagement with the sump of said claw bowl member and any milk of all four inlets accumulating therein.

* * * * *